United States Patent Office 3,084,200
Patented Apr. 2, 1963

3,084,200
CYCLOPENTADIENE DERIVATIVES
Thomas Leigh, Macclesfield, England, assignor to Imperial Chemical Industries Limited, London, England, a corporation of Great Britain
No Drawing. Filed Nov. 12, 1959, Ser. No. 852,183
Claims priority, application Great Britain Dec. 17, 1958
4 Claims. (Cl. 260—611)

This invention relates to organic compounds and more particularly it relates to cyclopentadiene derivatives which are valuable as intermediate products.

According to the invention we provide cyclopentadiene derivatives of the formula:

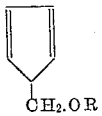

wherein R stands for an alkyl radical.

Suitable compounds of the above stated formula may be, for example methoxymethylcyclopentadiene, ethoxymethylcyclopentadiene and n-butoxymethylcyclopentadiene.

According to a further feature of the invention we provide a process for the manufacture of the said cyclopentadiene derivatives which comprises interaction of a cyclopentadiene metal derivative and an ether of the formula:

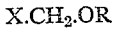
X.CH$_2$.OR wherein X stands for a halogen atom and R has the meaning stated above.

As suitable cyclopentadiene metal derivatives there may be mentioned, for example, cyclopentadienyl sodium, cyclopentadienyl lithium, di-cyclopentadienyl calcium and cyclopentadienyl magnesium halides such as cyclopentadienyl magnesium bromide. Suitable ethers of the above stated formula to be used as starting materials may be chloromethyl methyl ether, chloromethyl ethyl ether and chloromethyl n-butyl ether.

The said process is preferably carried out in the presence of an inert non-hydroxylic solvent or diluent, for example diethyl ether or tetrahydrofuran, and at a relatively low temperature, for example between about —20° C. and 10° C.

As said, the cyclopentadiene derivatives of the invention are valuable as intermediates. Thus they are valuable as intermediates in the manufacture of ferrocene derivatives, for example 1,1'-dineopentyl ferrocene, which possess haematinic activity (see my copending U.S. applications Serial No. 852,182 and now Patent No. 3,036,136 and Serial No. 852,181, both filed on even date herewith, and corresponding respectively to British Patents 858,078 and 870,949.)

The invention is illustrated but not limited by the following examples in which the parts are by weight:

Example 1

33 parts of cyclopentadiene are added during 30 minutes to a stirred suspension of 11.5 parts of sodium in 100 parts of tetrahydrofuran in an atmosphere of nitrogen and maintained at a temperature of 25–30° C. After stirring for a further 2 hours, the solution of cyclopentadienyl sodium is added during 30 minutes to a stirred solution of 47 parts of chloromethyl ethyl ether in 80 parts of diethyl ether at a temperature of —20° C. to —10° C. The reaction mixture is then raised to a temperature of 5–10° C. for one hour and then poured on to ice. The ethereal solution is separated, washed with water and dried over sodium sulphate. The diethyl ether is removed by distillation at 12 mm. pressure and the residue is then fractionally distilled at reduced pressure. There is thus obtained ethoxymethylcyclopentadiene as a colourless liquid, B.P. 220° C./0.5 mm.

Example 2

A solution of 55 parts of ethyl bromide in 80 parts of diethyl ether is added during one hour to a stirred suspension of 12 parts of magnesium turnings in 20 parts of diethyl ether at 20–35° C. 33 parts of cyclopentadiene are added and the mixture is stirred for twenty-four hours. The solution is cooled to —10° C. and 56 parts of chloromethyl n-butyl ether are added during one hour. The temperature of the reaction mixture is raised to 10° C. for two hours and the reaction mixture is then poured on to ice. The ethereal solution is separated, washed with water and dried over sodium sulphate. The diethyl ether is removed by distillation at 12 mm. pressure and the residue which is left consists of n-butoxymethylcyclopentadiene.

Example 3

33 parts of cyclopentadiene are added during 30 minutes to a stirred suspension of 11.5 parts of sodium in 100 parts of tetrahydrofuran in an atmosphere of nitrogen and maintained at a temperature of 20–25° C. When the addition is complete the mixture is stirred for a further 2 hours and then added during 45 minutes to a stirred solution of 40 parts of chloromethyl methyl ether in 80 parts of diethyl ether at a temperature of —20° C. to —10° C. The mixture is raised to a temperature of 5–10° C. for 3 hours and then poured on to ice. The mixture is separated and the ethereal layer is washed with water and dried. The diethyl ether is removed by distillation at 12 mm. pressure and the residue is then fractionally distilled under reduced pressure. Methoxymethylcyclopentadiene is thus obtained as a colourless liquid, B.P. 18–19° C./0.5 mm.

What I claim is:
1. Cyclopentadiene derivatives of the formula:

wherein R stands for an alkyl radical containing up to four carbon atoms.
2. A compound according to claim 1 wherein R is methyl.
3. A compound according to claim 1 wherein R is ethyl.
4. A compound according to claim 1 wherein R is n-butyl.

References Cited in the file of this patent

Karrer: Organic Chemistry, 4th Ed. (1950), pages 28 and 29. (Copy in Library.)